United States Patent [19]

Cuza

[11] 4,174,660
[45] Nov. 20, 1979

[54] DEVICE TO SEPARATE LIQUIDS AND SOLIDS IN A MIXTURE

[76] Inventor: Cerso R. Cuza, 2940 NW. 22 St., Miami, Fla. 33142

[21] Appl. No.: 929,514

[22] Filed: Jul. 31, 1978

[51] Int. Cl.² .............................................. A23N 1/00
[52] U.S. Cl. .................................... 99/495; 99/503; 99/511; 99/513
[58] Field of Search ............... 99/495, 511, 512, 513, 99/503; 241/2, 91, 228, 68–74; 209/190, 199; 210/174; 233/27

[56] References Cited

U.S. PATENT DOCUMENTS

| 1,343,439 | 6/1920 | Dostal | 99/511 |
| 1,349,739 | 8/1920 | Steere | 99/511 |
| 1,369,180 | 2/1921 | Lindenberg | 99/512 X |
| 2,054,342 | 9/1936 | Schwarz | 99/511 |
| 2,172,790 | 9/1939 | Ferrari et al. | 99/513 |
| 2,548,812 | 4/1951 | Patterson | 99/512 |
| 4,034,664 | 7/1977 | Hassell | 99/511 |
| 4,119,542 | 10/1978 | Yomaoka et al. | 99/512 X |

Primary Examiner—Stanley N. Gilreath

[57] ABSTRACT

A device for use in separating solids and liquids in a mixture whicn includes an annular centrifugal drum having an annular peripheral perforated surface through which juice is adapted to be extracted from a mixture of solids and liquids within the drum by centrifugal force and a deflector means to deflect the juice extracted to a vessel and wherein a second collector means is provided with a portion extending into the drum to collect solid particles after the liquids have been separated from it and to conduct it exteriorly of the drum for collection and wherein a drive motor is provided and suitable belts for rotating the drum.

12 Claims, 3 Drawing Figures

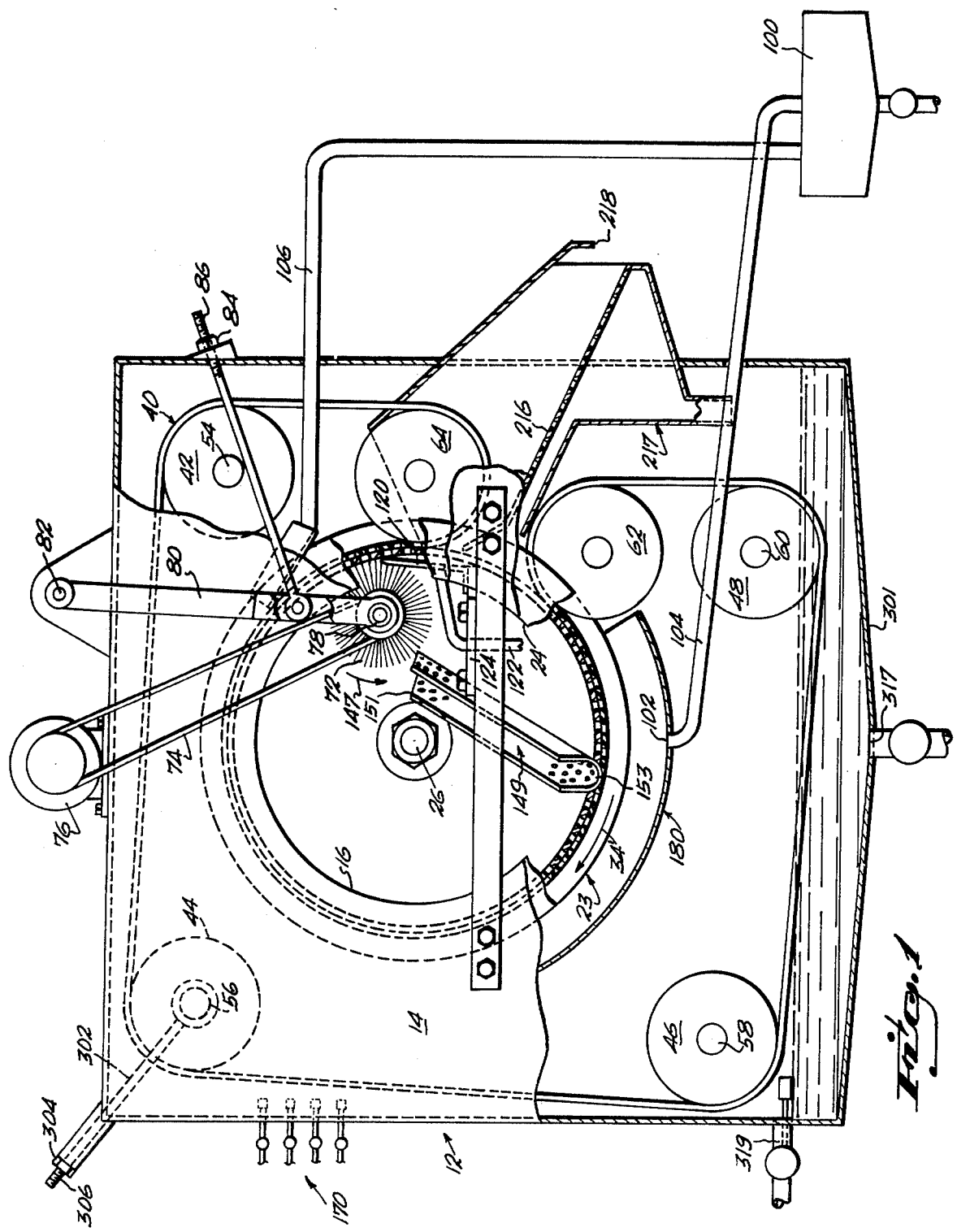

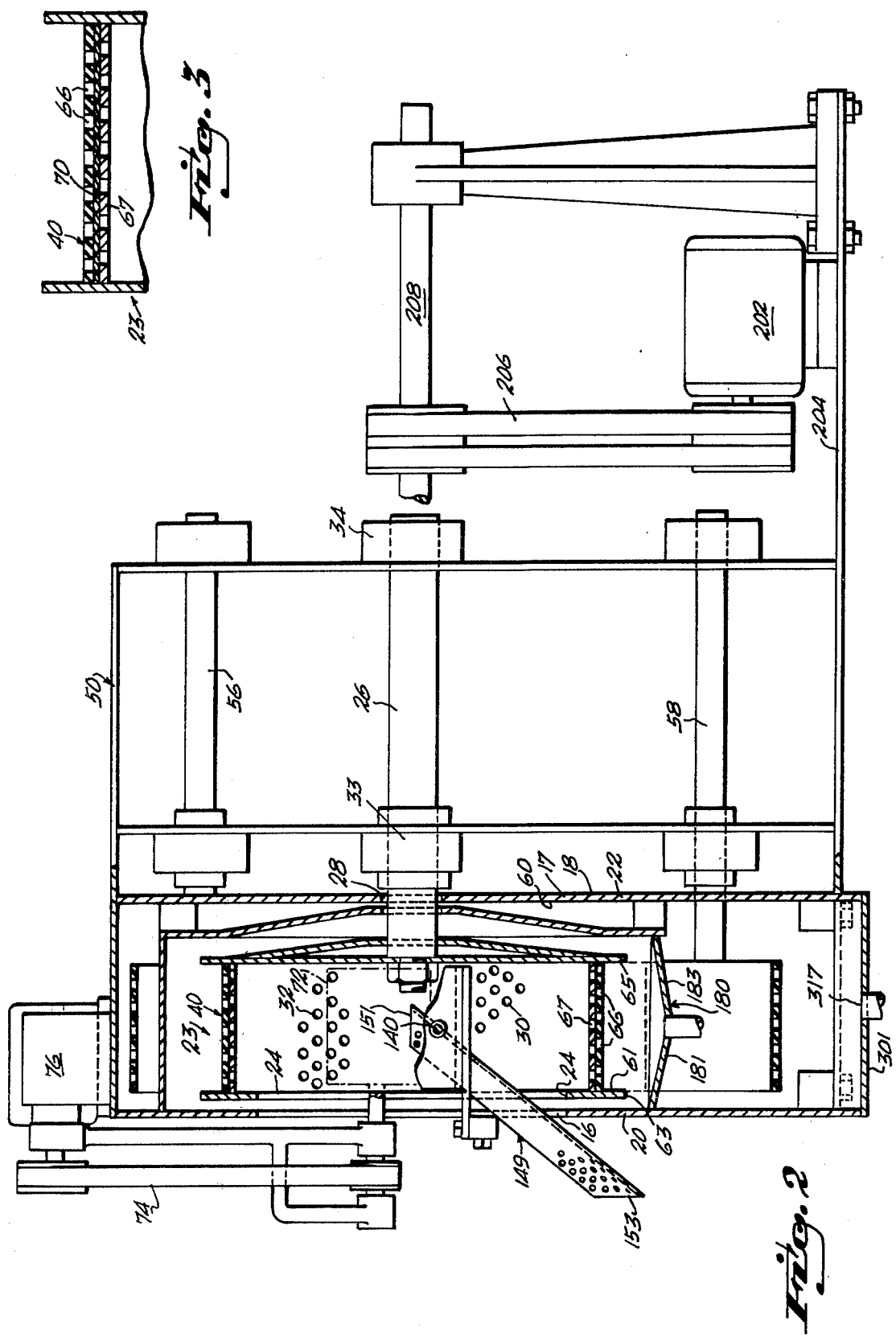

DEVICE TO SEPARATE LIQUIDS AND SOLIDS IN A MIXTURE

FIELD OF THE INVENTION

This invention relates to a separator of liquids from a mixture of solids and liquids.

BACKGROUND OF THE INVENTION

In the past there have been numerous uses of sugarcane, among them the collection of juice and the sugarcane which remains after the juice has been extracted.

This invention is for use to extract or separate juice, that is a liquid, from other particles in a mixture, such as that which results from the use of a sugarcane pulverizer and a juice collector; the device separates the juice from solid material of the liquid.

OBJECTS OF THE INVENTION

It is an object of this invention to provide an improved sugarcane juice separator and collector wherein means are provided to extract or separate sugarcane juice or other liquid from a mixture of the liquid and other material, such as after cane has been pulverized, collecting the juice and the solid particulate matter for subsequent use.

It is a general object of this invention to provide an improved separator for liquids from solids in particulate form, such as a mixture of particles and juice from a sugarcane pulverizer and juice collector which is well adapted for the purpose which it is intended and which is effective to remove from sugarcane juice which has been separated from the remainder after the juice has been removed and wherein the remainder is separated and the juice is collected.

In accordance with these and other objects which will become apparent hereinafter, the instant invention will now be described with reference to the accompanying drawings, in which:

DESCRIPTION OF THE DRAWINGS

FIG. 1 is an elevation view which has been broken away to illustrate the interior parts of the invention;

FIG. 2 is a side elevation view of FIG. 1 which is partly in cross section;

FIG. 3 is an enlarged view of a portion of FIG. 2 to illustrate details of the invention.

DESCRIPTION OF THE PREFERRED EMBODIMENT

Referring to the drawings wherein like reference characters designate like or corresponding parts throughout the several views, and referring particularly to FIG. 1, there is shown a housing generally designated by the numeral 12 having a front face 14 with a circular opening 16 centrally arranged therein; and, as seen in FIG. 2. The housing has a rear face 18 as well as a front and rear wall 20 and 22 between the faces. Within the chamber thus defined there is an annular centrifugal drum 23 having an opening 24 to register with the opening 16 when mounted on an idle shaft 26 which extends through a hole 28 in the rear face 60 and a support wall 17. The outer annular surface of the drum is perforated as indicated by the pattern of holes designated by the numerals 30 and 32 in FIG. 2 of the drawings. The shaft is provided with bearings as at 33 and 34 for rotation of it and the drum which is keyed to it as indicated by the arrowed line 34'. About the drum there extends a belt generally designated by the numeral 40 at the upper right in FIG. 1 which is supported by pulleys 42, 44, 46 and 48 which are supported by a frame designated by the numeral 50 in FIG. 2 and each of which is journaled on a shaft 54, 56, 58 and 60. Additionally, pulleys 62 and 64 are provided as shown in FIG. 1 at the right and these guide the belt so that it extends about the drum in an annular recess designated by the numeral 61 in FIG. 2 between the flanges 63 and 65 on the perforated exterior wall 67 of the drum. The belt is provided with holes as indicated by the numeral 66.

When a mixture of liquid and particulate matter, such as a juice mixture is inserted into the opening 16 and into the drum, the drum turns rapidly causing the juice to be expelled through the openings in the drum and through the belt. The juice also passes through a screen, see FIG. 3, on the exterior of the drum which screen is designated by the numeral 70.

Within the chamber a brush 72 of circular cross section is provided and driven by a belt 74 run by a motor 76, the brush being mounted by bearings 78 on an arm 80 pivotally supported on the frame as at 82 and adjustable by adjusting the nut 84 inwardly or outwardly on the threaded end 86 of the adjustment screw. It will be seen that when the drum is running, the brush will be effective to sweep the interior perforated surface of the drum.

To collect the juice, a collector means, shown at the lower right of FIG. 1 and designated by the numeral 100, is provided; the juice is collected through an opening 102 and conducted by a pipe 104 to the collector 100. Some of the juice will find its way about the exterior of the drum and is collected by means of the pipe 106 at the upper portion thereof as shown at the right in FIG. 1.

Also, within the drum there is a deflector blade adjacent the brush which is designated by the numeral 120 and this is supported on a pipe 122 which in turn is supported on brackets 124 suitably mounted on the housing 12. The pipe 122 is hollow defining a through passageway, see FIG. 2 wherein that opening is designated by the numeral 140. Through this pipe water is directed to aid the deflecting and brushing process. From the deflecting and brushing process, there will be fine particles which are thrust in the direction of the arrowed line 147 and which are collected by a channel member 149 having an upper end 151 adjacent the brush and a lower end 153 which extends outwardly of the front face opening 16. These particles are separated from the liquid comprising juice in the example given which is collected, for example in a basket or container.

Additionally, spray means, in a bank generally designated by the numeral 170, are provided, as shown at the upper left of FIG. 1 to spray the belt to keep it relatively clean. In the preferred embodiment about the drum the collector system includes a shield 180 to guide liquid flow, the lower portion of which is preferably composed of downwardly converging portions 181 and 183 defining a trough to collect the juice.

To drive the drum a suitable motor 202 is mounted on a frame 204 and by means of pulleys 206 it is connected to the main drive shaft 208 which is connected to the drive pulley, generally referred to earlier and designated by the numeral 64. It will be appreciated that the belt and drum adjacent this pulley 64 will be a point at which some juice will be thrust from between the belt and drum; and to this end a collector plate 216 is provided which is perforated so that juice flowing over it will filter downwardly through the collector member 217 and into the collector system while out of the mouth 218 some pulverized material advances to be collected.

Belt tightening means are provided in the preferred embodiment in the form of an arm 302 which is adjustable by means of a nut 304 on a threaded rod 306 so as to tighten the pulley 44 by moving the shaft 56 up to tighten the belt. In the floor 301 of the device there is an outlet 317 and other fittings as at 319 to keep the level of water within the container from the sprays at a predetermined level and through which the belt is constrained to pass by reason of the arrangement of the lower pulleys 46 and 48 so that it is washed in its continuous path.

It is thus seen that there has been provided a machine which is highly adapted for use in extracting juice from the extract of sugarcane which has been pulverized, the sugarcane residue to be collected for subsequent use.

While the instant invention has been shown and described in a preferred embodiment, it is recognized that departures may be made within the spirit of this invention which should not therefore be limited except as set forth in the claims.

What is claimed is:

1. A device to separate solids from juice in a mixture of juices and solids and a collector for the juice, said device comprising a frame, an annular centrifugal drum journaled on the frame, said drum having an annular peripheral perforated surface spanned by spaced faces, one of said faces having a charge opening, shield means arranged about the drum in spaced relation therefrom, a drive belt in driving engagement about the drum, said belt having holes by reason of which, when the drum is rotated, juice is extracted from the mixture by centrifugal force and flows radially outwardly through the drive belt holes and drum, said shield means comprising guide means to guide the flow of juice, said machine including drive means for the drum belt, and said device including a first collector means to collect the juice from the shield and a second collector means having a first end zone within the drum and a second end zone outside of said drum and said second collector means extending through said charge opening and adapted for discharging solids from the machine.

2. The device as set forth in claim 1 wherein said drive belt is provided with guide means.

3. The device as set forth in claim 1 wherein said guide means comprises a plurality of pulleys spaced about said drum.

4. The device as set forth in claim 1 wherein said first collector means includes pipe means and a collector vessel.

5. The device as set forth in claim 1 wherein said device includes means for tightening said belt.

6. The device as set forth in claim 1 wherein said collector means comprises a plurality of pipes in spaced relation from one another each having an opening in spaced relation.

7. The device as set forth in claim 6 wherein one of said openings is at said shield means.

8. The device as set forth in claim 1 wherein said second collector means includes brush means to brush the drum peripheral perforated surface within the drum.

9. The device as set forth in claim 9 wherein scraper means are arranged to scrape the peripheral perforated surface of the drum within the drum and adjacent said brush means.

10. The device as set forth in claim 1 wherein spray means are provided for said belt.

11. The device as set forth in claim 1 wherein a housing is provided about said drum and spray means are included and supported on said housing and each includes a nozzle to direct water spray on the drive belt.

12. The device as set forth in claim 11 wherein said housing comprises a lower portion and said lower portion is adapted to collect water from said spray means and said belt is constrained to pass through said water for washing.

* * * * *